July 30, 1940.     H. E. TAUTZ     2,209,484
VARIABLE SPEED MECHANISM
Filed Dec. 31, 1937     3 Sheets-Sheet 3
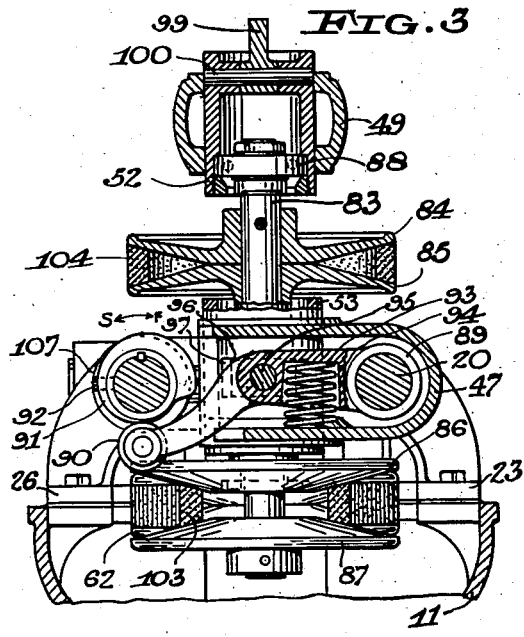
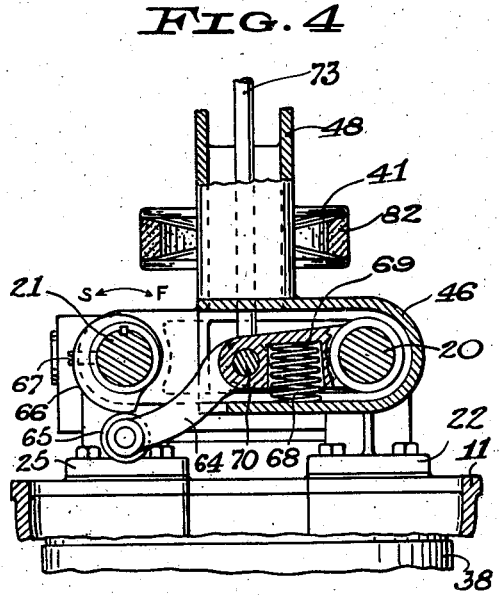
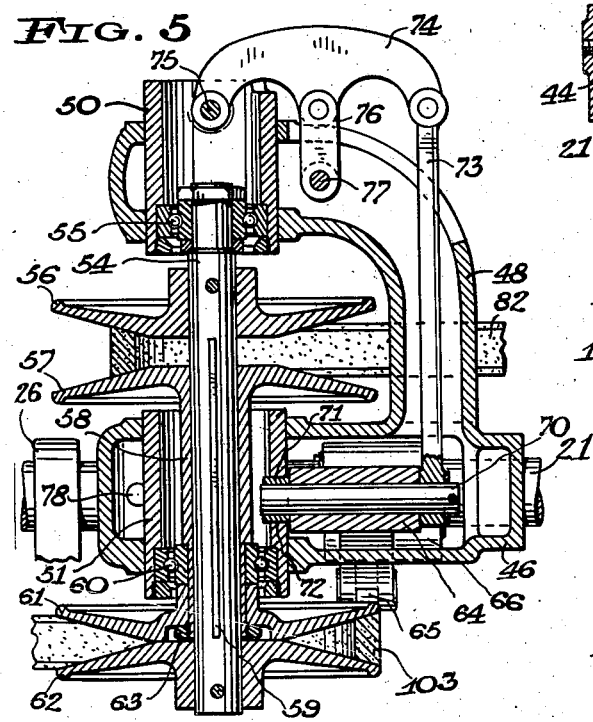
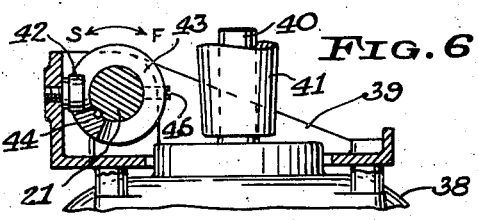
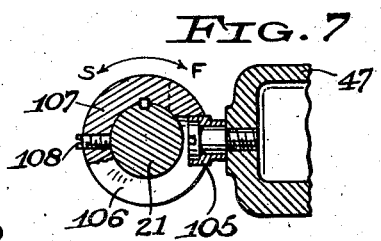
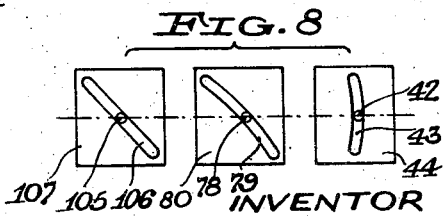

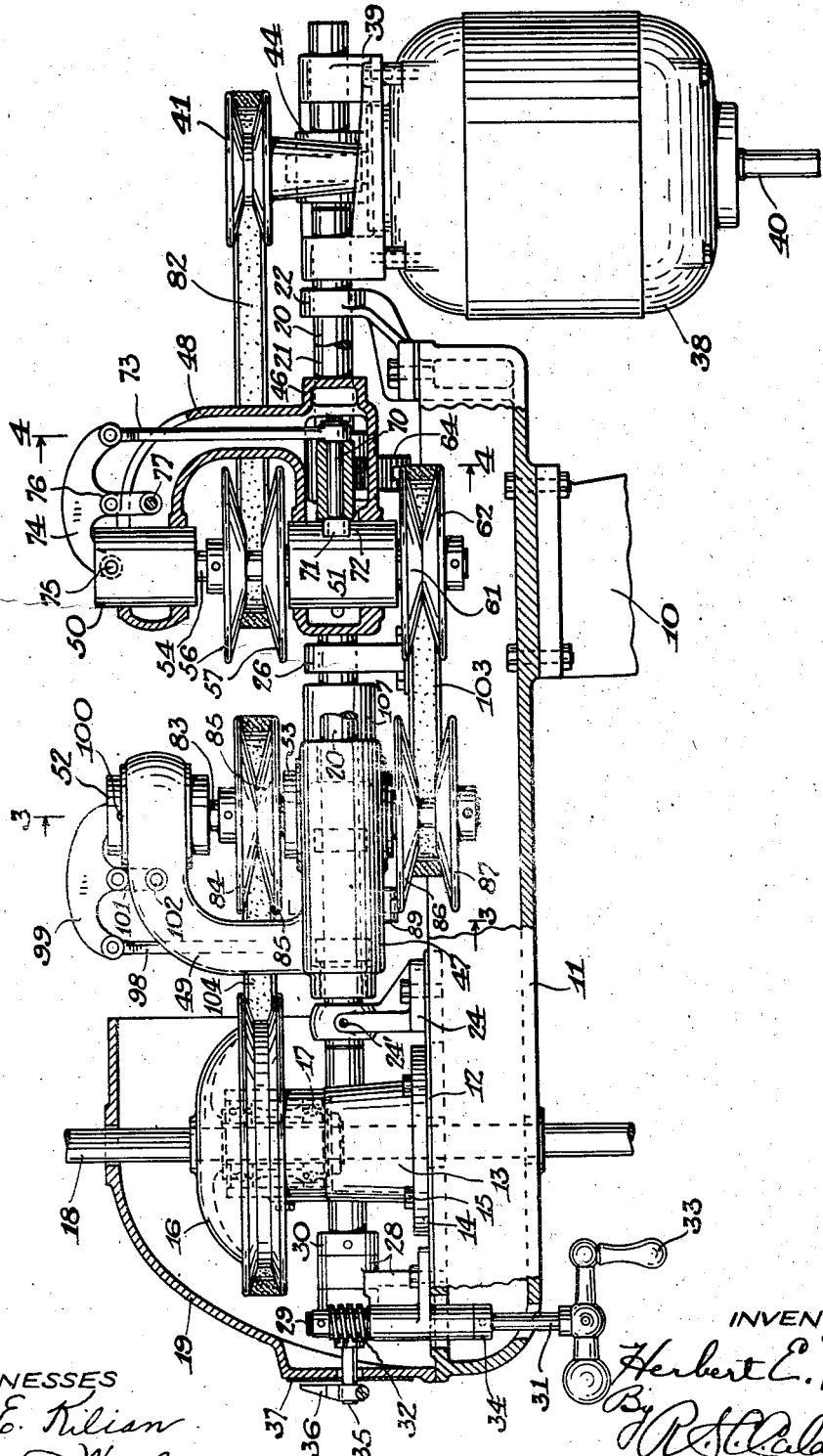

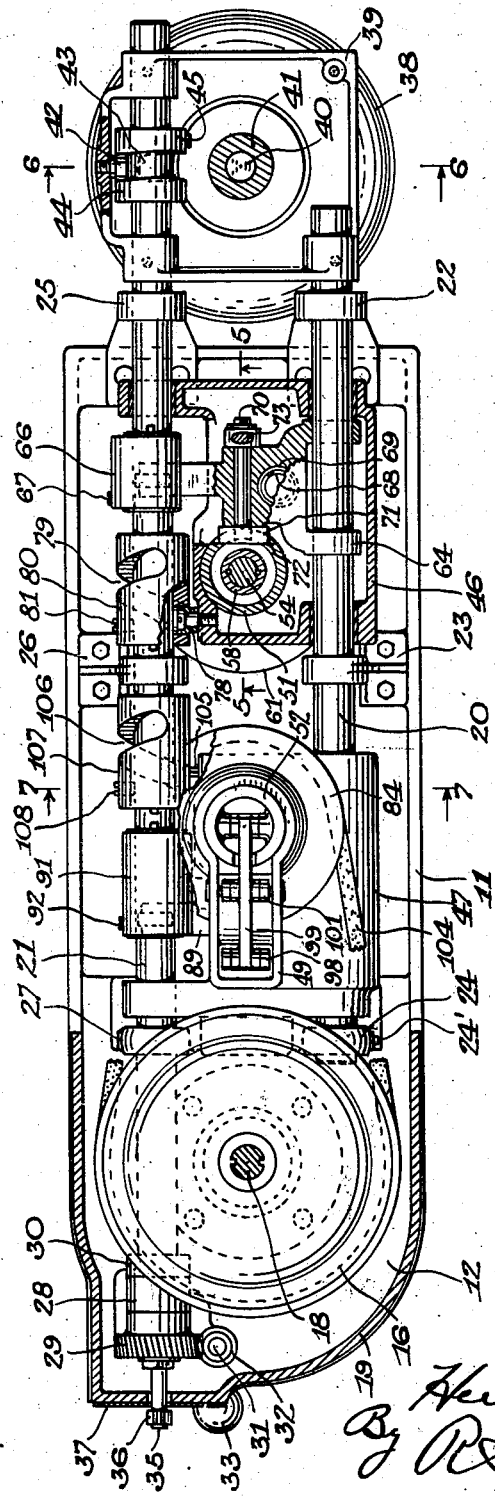

Patented July 30, 1940

2,209,484

UNITED STATES PATENT OFFICE 2,209,484

VARIABLE SPEED MECHANISM

Herbert E. Tautz, Milwaukee, Wis., assignor to The Delta Manufacturing Company, Milwaukee, Wis., a corporation of Wisconsin Application December 31, 1937, Serial No. 182,821

13 Claims. (Cl. 74—230.17)

The invention relates to power transmission mechanism and more particularly to mechanism for transmitting power at variable speeds by means of belts.

Belt transmissions of the type embodying one or more expansible pulleys with relatively adjustable belt-driving flanges or pulley sections have heretofore been open to various objections, such as misalignment, excessive belt wear, undue belt tightness and slackness at certain speed adjustments, difficulty in replacing belts and relatively complicated and expensive construction.

It is an object of the present invention to provide an improved variable speed belt transmission mechanism of the expansible pulley type which is controlled in such manner as to insure pulley alignment and proper belt tension at different speed ratios, and to avoid excessive belt pressure and wear.

Another object of the invention is to provide a variable speed mechanism having simple and easily operated means for conjointly and positively controlling both the distance between belt-connected pulleys and the effective diameter of at least one of the pulleys.

A further object is to provide a variable speed mechanism which has a wide speed range, which is easily and accurately adjusted as to speed, and which will operate quietly and efficiently throughout its speed range.

A still further object is to provide a variable speed mechanism which can be economically manufactured, which will permit easy changing of transmission belts, and which is adapted for driving various kinds of machinery.

The invention further consists in the several features hereinafter described and claimed.

In the accompanying drawings, illustrating an embodiment of the invention,

Fig. 1 is a side elevation of a variable speed mechanism constructed in accordance with the invention, parts being broken away and parts being shown in section, and the mechanism being adjusted for high speed operation;

Fig. 2 is a plan view of the mechanism, parts being broken away and parts being shown in section;

Fig. 3 is a sectional view taken generally along the line 3—3 of Fig. 1;

Fig. 4 is a sectional view taken generally along the line 4—4 of Fig. 1;

Fig. 5 is a sectional view taken generally along the line 5—5 of Fig. 2;

Fig. 6 is a sectional view taken generally along the line 6—6 of Fig. 2;

Fig. 7 is a sectional detail view taken generally along the line 7—7 of Fig. 2, and Fig. 8 is a diagrammatic developed view of cam means for the mechanism.

In these drawings, the invention is illustrated by way of example in a variable speed drive for a drill press, but it will be understood that the invention is applicable generally for driving various kinds of machinery.

The column 10 (Fig. 1) of the drill press has rigidly bolted or otherwise secured thereon a horizontally extending, trough-shaped frame 11 provided with an apertured platform 12 at its front portion. A tubular bearing housing 13 has a peripheral bottom flange 14 resting on the platform 12 and secured thereto by screws 15. A V-pulley 16 surmounts the housing 13 and has a vertical sleeve-like hub portion journalled in the housing on ball bearings 17. The pulley has splined therein a spindle-driving shaft 18 which extends through apertured portions of the frame 11. A hood 19 is detachably mounted on the frame to guard the pulley and is apertured to pass the shaft 18.

A pair of parallel, horizontal guide rods 20 and 21 (Figs. 1 and 2) extend longitudinally above the frame 11 and project rearwardly beyond the frame, the guide rods supporting thereon various instrumentalities hereinafter described. The guide rod 20 is mounted in spaced bearing brackets 22, 23 and 24 upstanding from, and secured to, the frame 11, and is confined against rotation and axial movement, as by a setscrew 24' in the bearing bracket 24. The guide rod 21, which is somewhat longer than the guide rod 20, is mounted in similar spaced bearing brackets 25, 26 and 27, and in a front bearing bracket 28 secured to the platform 12. The guide rod 21 forms a shaft rotatable in its several bearing brackets and is confined against axial movement by a gear 29 and a collar 30 secured to the rod and engaging the front bearing bracket. A vertical shaft 31 is journalled in the bearing bracket 28 and carries a worm 32 at its upper end meshing with the gear 29. The shaft 31 projects downwardly through the frame 11 and carries a hand-crank 33 at its lower end. The shaft 31 is confined against axial movement by the worm 32 and by a collar 34 which engages a downwardly projecting portion of the bracket. A detachable shaft extension 35 on the guide rod 21 projects through the front portion of the hood 19 and carries a detachable pointer 36 which cooperates with a dial 37 on the hood to indicate the adjusted angular position of the shaft-forming rod 21.

An electric motor 38 (Figs. 1 and 2) is slidably hung on the rearwardly projecting portions of the guide rods 20 and 21 by a lugged plate 39 which is rigidly secured to the upper end of the motor and which is horizontally bored to slidably fit on the rods, the plate being apertured to admit the upper end of the vertical shaft 40 of the motor. The upper end of the motor shaft carries a V-pulley 41 which has a variable speed driving connection with the driven pulley 16, as hereinafter described. A side wall of the motor plate carries a cam follower 42 of the roller type, Figs. 2 and 6, which rides in the slot 43 of a drum cam 44 slidably keyed on the rotatable guide rod 21 and secured thereon in axially adjusted position by a set-screw 45.

A pair of hollow shaft carriers or housings 46 and 47 (Fig. 2) are bored and bushed to slidably fit on the guide rods 20 and 21 between the motor pulley 41 and the driven pulley 16, the carrier 46 being disposed between the bearings 22 and 23, and the carrier 47 being disposed between the bearings 23 and 24. The carrier 46 has a curved or hooked upwardly projecting hollow arm 48, and the carrier 47 has a similar arm 49. The two carriers are the same except that they are of opposite hand. The carrier 46 and its overhanging arm are vertically bored to slidably receive aligned upper and lower quills or sleeves 50 and 51, respectively. The carrier 47 is similarly provided with slidable upper and lower quills or sleeves 52 and 53, respectively.

A shaft 54 (Fig. 5) is rotatably mounted at its upper end in the sleeve 50 by means of a ball bearing 55, and extends downwardly through the sleeve 51. At its upper portion the shaft 54 carries a pair of conically faced upper and lower pulley sections or flanges 56 and 57 forming an expansible side-driving pulley, the pulley section 56 being pinned to the shaft. The pulley section 57 has an elongated sleeve-like hub 58 which is splined on the shaft by keys 59 and is rotatably mounted in the lower portion of the sleeve 51 by a ball bearing 60 fixed therein, thus rotatably supporting the lower portion of the shaft 54. Below the sleeve 51, the shaft 54 carries a pair of conically faced pulley sections 61 and 62, the latter being pinned to the lower end of the shaft and the former being keyed on the reduced lower end of the elongated hub 58 and secured thereto by a countersink nut 63.

The pulley sections 56, 57, 61 and 62 are axially shiftable to vary the effective diameters of the two expansible pulleys formed by these sections. The shaft 54 and the pulley sections 56 and 62 pinned thereto are axially shiftable by the upper quill or sleeve 50, in which the shaft is rotatably mounted and retained against relative axial movement. The intermediate pulley sections 57 and 61, secured to the opposite ends of the sleeve-like hub 58, are axially shiftable by the lower quill or sleeve 51, in which the hub 58 is rotatably mounted and retained against relative axial movement. The ball bearings resist both radial and axial thrust.

A lever or rocker arm 64 (Figs. 2 and 4) has a forked end pivotally mounted on the guide rod 20 within the hollow carrier 46, the lever being confined against axial movement and extending laterally of the sleeve 51. The free end of the lever projects from the carrier and has a cam follower 65 of the roller type riding on a cam 66 slidably keyed on the rotatable guide rod 21, the cam 66 being secured to the rod in axially adjusted position by a set-screw 67. The cam roller 65 is held against the cam by a coiled spring 68 which is disposed in a pocket 69 formed in the lever and bears against an inner wall of the hollow carrier 46. The lever 64 has mounted therein a pin 70 extending parallel to the guide rods and projecting from opposite sides of the lever (Fig. 5). At the end adjacent the sleeve 51 (Figs. 2 and 5), the pin is journalled in a block 71 which slidably fits in a cross slot 72 cut in the side wall of the sleeve, the block being confined against axial shifting by the lever and by the bottom of the slot. At its other end the pin pivotally engages the lower end of a link 73 (Fig. 5) which extends upwardly through the hollow open-topped arm 48 of the shaft carrier 46. A lever or rocker arm 74 has one end engaging the forked upper end of the link 73 and the other end entering the open upper end of the sleeve 50 to which it is pivotally secured by a pin 75, a side of the sleeve being notched for lever clearance. An intermediate portion of the lever 74 is pivotally mounted on a pair of links 76 which extend through the open top of the arm 48 and are pivoted therein on a pin 77. The angular movement of the lever 64 by the rotary cam 66 thus serves to move the sleeves 50 and 51 with their respective pulley sections in opposite directions, so that the upper pulley 56, 57 is made smaller in effective diameter when the lower pulley 61, 62 is made larger in effective diameter, and vice versa, the median planes of the pulleys remaining at the same elevations to preserve alignment. The cam position of Fig. 4 produces the pulley conditions of Fig. 5.

The shaft carrier 46 is slidable on the guide rods 20 and 21 and is shiftable thereon simultaneously with the change in pulley diameters in such manner that when the upper pulley 56, 57 is increased in effective diameter the carrier will be moved toward the motor 38. This is accomplished by a roller cam follower 78 (Fig. 2) secured to the carrier in the axial plane of the guide rods and riding in an approximately helical cam slot 79 formed in a drum cam 80. The drum cam is slidably keyed on the guide rod 21 and is secured thereon in axially adjusted position by a set-screw 81. The cam 66 is sufficiently long so that the roller 65 remains in contact therewith in the travel of the shaft carrier along the guide rods. The expansible pulley 56, 57, is connected to the motor pulley 41 by a V-belt 82 which because of such sliding movements of the carrier remains taut regardless of changes of pulley diameter.

The quills or sleeves 52 and 53 (Fig. 3) for the shaft carrier 47 have rotatably mounted therein a shaft 83 which supports thereon an upper expansible pulley 84, 85, and a lower expansible pulley 86, 87, the upper end of the shaft being carried on a ball bearing 88 in the sleeve 52, and the hub of the pulley section 85 being carried on a ball bearing, not shown, in the sleeve 53. The shaft and pulley construction and mounting are the same as those for the carrier 46.

A lever or rocker arm 89 (Fig. 3), similar in construction and mounting to the lever 64, is disposed in the carrier 47 and at its free end carries a roller cam follower 90 riding on a cam 91 which is slidably keyed on the rotatable guide rod 21, the cam 91 being secured to the rod in axially adjusted position by a set-screw 92. The cam follower 90 is held against the cam by a coiled spring 93 disposed in a pocket 94 in the lever and bearing against an inner wall of the hollow carrier 47. The lever has mounted therein a pin 95 similar to the pin 70, the pin 95 at one end being journalled in a block 96 slidably fitting in a cross slot 97 formed on a side wall of the sleeve 53, Fig. 3. At its other end, the pin pivotally engages the lower end of a link 98 similar to the link 73. The forked upper end of the link 98 (Fig. 1) is pivotally secured to one end of a lever 99 which has its other end pivotally attached to the sleeve 52 by a pin 100. The lever 99 is pivotally mounted intermediate its end on a pair of links 101 which are pivoted on the carrier arm 49 by a pin 102. The expansible pulleys 84, 85, and 86, 87, are thus controlled in the same manner as the pulleys 56, 57, and 61, 62, on the carrier 56, except that the cams 66 and 91 associated with the carriers 46 and 47, respectively, are so arranged that when the effective diameter of the lower pulley 61, 62 increases, the effective diameter of the lower pulley 86, 87 decreases. The pulleys 61, 62, and 86, 87, are connected by a V-belt 103, and the pulley 84, 85, and the driven pulley 16 are connected by a V-belt 104.

The shaft carrier 47 is slidable on the guide rods 20 and 21 and is shiftable thereon simultaneously with the change in pulley diameters in such manner that when the upper pulley 84, 85, is decreased in effective diameter the carrier will be moved away from the driven pulley 16. This is accomplished by a roller cam follower 105 (Figs. 2 and 7) secured to the carrier 47 in the axial plane of the guide rods and riding in a substantially helical cam slot 106 formed in a drum cam 107. This drum cam, which is similar to the cam 80, is slidably keyed on the guide rod 21 and is secured thereon in axially adjusted position by a set-screw 108. The cam 91 is sufficiently long so that the roller 90 remains in contact therewith in the travel of the shaft carrier 47 along the guide rods.

Both pulley sections of each of the several expansible pulleys are moved positively in axial direction so as to maintain pulley alignment and adjusted pulley diameters and to relieve the belts from the function of pulley adjustment. The shaft carriers and motor are slidable along the guide rods simultaneously with pulley adjustment to maintain proper belt tension. In order to avoid belt slackness at intermediate speeds the cam slots of the several drum cams are suitably shaped as indicated in Fig. 8, showing a developed view of these cams. The cam slot 106 of the drum cam 107 (for the shaft carrier 47) is here indicated to be approximately helical. The cam slot 79 of the drum cam 80 (for the shaft carrier 46) departs from a helical form in such manner that although the shaft carriers are about the same distance apart at high speed and low speed adjustments, they are slightly farther apart at intermediate speed adjustments so as to take up belt slack. The cam slot 43 for the motor-adjusting cam 44 is made slightly curved so that although the motor is in about the same position at high speed and low speed adjustments, the motor is farther out from the frame 11 at intermediate speed adjustments, thus taking up belt slack. The cam-supporting guide rod 21 is here indicated to be rotatable through three-fourths of a revolution.

In operation, power is transmitted from the motor 38 to the driven pulley 16 by the several V-belts and the expansible pulleys on the shafts 54 and 83, these shafts forming counter-shafts or jack-shafts. The drive takes place through the V-belt 82 which connects the motor pulley 41 and expansible pulley 56, 57 on the shaft 54, then through the V-belt 103 which connects the expansible pulleys 61, 62, and 86, 87, on the shafts 54 and 83, respectively, and finally through the V-belt 104 which connects the driven pulley 16 with the expansible pulley 84, 85, on the shaft 83. The mechanism is here shown to be adjusted for high speed operation, the guide rod 21 having been rotated clockwise (as viewed from the front of the drill press) to its limit position by the hand crank 33. The curved arrows in Figs. 3, 4 and 6 indicate the "slow" and "fast" adjustments of the guide rod 21. In effecting the high speed adjustment, the shaft carriers 46 and 47 are moved along the guide rods by the drum cams 80 and 107, respectively, toward the driven pulley, and the motor 38 is shifted slightly by the drum cam 44 to maintain the proper tension of the V-belt 82. Simultaneously, the several expansible pulleys are adjusted in effective diameter by the cams 66 and 91 cooperating with the spring-pressed levers 64 and 89, respectively. When a lower speed of the driven pulley is desired, the guide rod 21 is rotated counter-clockwise, as viewed from the front, thus causing the shaft carriers 46 and 47 to recede from the driven pulley, and changing the effective diameters of the expansible pulleys in such manner that the speed ratio of each of the three sets of belt-connected pulleys is reduced.

In setting up the mechanism for use, the proper tension for the several belts is obtained by axially adjusting the drum cams 44, 80 and 107 on the guide rod 21. This adjustment also compensates for variations in lengths of the belts. The cams may readily be readjusted, if necessary, to restore the proper belt tension after the belts have been in service. The construction of the mechanism permits the belts to readily be replaced without requiring dismantling of the mechanism, it being only necessary to remove the guard 19 and to loosen the drum cams so as to permit the worn belts to be slipped off and the new belts to be slipped on.

By limiting the ratio between the minimum and maximum effective diameters of the expansible pulleys, it is possible to use relatively narrow and inexpensive belts capable of quiet, high speed operation, while the use of a plurality of counter-shafts permits any desired overall speed ratio to be obtained. If a smaller speed range is sufficient for requirements, it is possible to omit one of the counter-shafts. By positively moving both sections of each expansible pulley, accurate pulley alignment and speed adjustment can readily be maintained, reducing belt wear and insuring efficient operation, especially in conjunction with the means for maintaining the proper belt tension. The parallel axes of the several pulleys all lie in a common plane, which is an advantage in many cases, as in a drill press drive. It would be possible, however, to offset one or more of the pulley axes if conditions should require. The pulley axes are here shown to be vertical, but they may also be placed in various other positions. While it is preferred to use parts in common for guiding and adjusting the pulley devices, it is possible to use separate means for these functions.

What I claim as new and desire to secure by Letters Patent is:

1. In a variable speed mechanism, the combination of a pair of rotatably mounted expansible pulleys having parallel axes, an endless belt connecting said pulleys, means for varying the effective diameters of said pulleys in opposite order, and means controlled conjointly with said last-named means for varying the distance between the pulley axes.

2. In a variable speed mechanism, the combination of rotatably mounted pulleys having parallel axes, a counter-shaft parallel to said pulley axes and movable toward and away from said pulleys respectively, a support carrying said counter-shaft, guide means on which said support is slidably mounted, a pair of expansible pulleys on said counter-shaft, driving belts connecting said counter-shaft pulleys with said first-named pulleys, and means for positively varying the effective diameters of said counter-shaft pulleys in opposite order and for conjointly shifting said support along said guide means.

3. In a variable speed mechanism, the combination of a pair of rotatably mounted pulleys having parallel axes, at least one of said pulleys being an expansible pulley, an endless belt connecting said pulleys, a shaft for said expansible pulley, a support having shaft-supporting portions at opposite sides of said expansible pulley and another portion rigidly connecting said shaft-supporting portions and extending between said pulleys, said expansible pulley having pulley sections adjustable axially toward and away from each other to vary the effective diameter of said pulley, and means for axially adjusting both of said pulley sections including respective actuating members slidably mounted in said shaft-supporting portions and carrying said shaft.

4. In a variable speed mechanism, the combination of a pair of rotatably mounted pulleys having parallel axes, at least one of said pulleys being an expansible pulley, an endless belt connecting said pulleys, a shaft for said expansible pulley, a support having shaft-supporting portions at opposite sides of said expansible pulley and said expansible pulley having pulley sections adjustable axially toward and away from each other to vary the effective diameter of said pulley, and means for axially adjusting both of said pulley sections including respective actuating members slidably mounted in said shaft-supporting portions and carrying said shaft.

5. In a variable speed mechanism, the combination of a support, guide means along which said support is slidable, an expansible pulley rotatably carried by said support and having a pair of opposed pulley sections axially shiftable in opposite directions to maintain the median plane of the pulley in fixed position during pulley adjustment, a rotatable shaft extending lengthwise of said guide means, and means operated by said shaft to vary the effective diameter of said expansible pulley by axially shifting both of said pulley sections and to move said support along said guide means.

6. In a variable speed mechanism, the combination of a rotatably mounted shaft, a non-rotatable support slidable along said shaft, an expansible pulley rotatably carried by said support and having a pair of opposed pulley sections axially shiftable in opposite directions to maintain the median plane of the pulley in fixed position during pulley adjustment, the axis of said pulley extending transversely of said shaft, and means operated by said shaft to move said support along said shaft and to conjointly vary the effective diameter of said pulley by axially shifting both of said pulley sections.

7. In a variable speed mechanism, the combination of guide means, a plurality of supports slidable along said guide means, pulleys rotatably carried by said respective supports and having parallel axes, at least one of said pulleys being an expansible pulley, an endless belt connecting said pulleys, and means for varying the effective diameter of said expansible pulley and for conjointly moving said supports along said guide means.

8. In a variable speed mechanism, the combination of a pair of rotatably mounted pulleys having parallel axes, at least one of said pulleys being an expansible pulley, an endless belt connecting said pulleys, a support for one of said pulleys, guide means along which said support is slidable to vary the distance between the pulley axes, a rotatable shaft extending lengthwise of said guide means, and means controlled by said shaft to vary the effective diameter of said expansible pulley and conjointly to vary the distance between the pulley axes, said controlling means having an adjustable connection permitting movement of said support along said guide means independently of the rotation of said shaft.

9. In a variable speed mechanism, the combination of a support having spaced portions with aligned openings, members slidable in said openings, a shaft journalled in one of said slidable members and extending through the other slidable member, a sleeve slidably fitting on said shaft and journalled in the other slidable member, pulley sections secured to the opposite end portions of said sleeve, pulley sections secured to said shaft and forming expansible pulleys with the pulley sections on said sleeve, and means for axially shifting said slidable members in opposite directions to vary the effective diameters of said expansible pulleys.

10. In a variable speed mechanism, the combination of a support, an axially shiftable shaft, an axially shiftable sleeve slidably fitting on said shaft, said shaft and sleeve being rotatably carried by said support, pulley sections secured to the opposite end portions of said sleeve, pulley sections secured to said shaft and forming expansible pulleys with the pulley sections on said sleeve, and positively-acting means for axially shifting said shaft and sleeve in opposite directions to vary the effective diameters of said expansible pulleys in opposite order.

11. In a variable speed mechanism, the combination of a plurality of supports movable relatively toward and away from each other, pulleys rotatably carried by said supports and having parallel axes, at least one of said pulleys being an expansible pulley, a belt connecting said pulleys, and means for varying the effective diameter of said expansible pulley and for conjointly moving both of said supports.

12. In a variable speed mechanism, the combination of a rotatably mounted power pulley and a rotatably mounted driven pulley having parallel axes, a counter-shaft parallel to said axes, movable supports for said power pulley and counter-shaft, expansible pulleys carried by said counter-shaft, belt means connecting said expansible pulleys with said power pulley and driven pulley, and means for varying the effective diameters of said expansible pulleys in opposite order and for conjointly shifting said supports to maintain belt tension.

13. In a variable speed mechanism, the combination of a pair of parallel guide rods at least one of which is rotatable, a support slidable along said rods, an expansible pulley rotatably carried by said support, a cam on the rotatable rod, a lever pivoted on the other rod and swingable by said cam, means connected to said lever for varying the effective diameter of said expansible pulley, and a second cam on the rotatable rod for shifting said support along said rods conjointly with the change in the effective diameter of said expansible pulley.

HERBERT E. TAUTZ.